US012687068B2

(12) United States Patent
Matsuno et al.

(10) Patent No.: US 12,687,068 B2
(45) Date of Patent: Jul. 21, 2026

(54) AUTHENTICATION GATE

(71) Applicant: TOYOTA JIDOSHA KABUSHIKI KAISHA, Aichi-ken (JP)

(72) Inventors: Keisuke Matsuno, Nagoya (JP); Atsushi Narita, Okazaki (JP); Sho Hiruta, Chuo-ku (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/929,479

(22) Filed: Oct. 28, 2024

(65) Prior Publication Data

US 2025/0137325 A1 May 1, 2025

(30) Foreign Application Priority Data

Nov. 1, 2023 (JP) ................................ 2023-187997

(51) Int. Cl.
*E06B 11/08* (2006.01)
*G07C 9/10* (2020.01)

(52) U.S. Cl.
CPC ............ *E06B 11/08* (2013.01); *E06B 11/085* (2013.01); *G07C 9/10* (2020.01)

(58) Field of Classification Search
USPC ............................................... D25/48.5, 48.6
See application file for complete search history.

(56) References Cited

U.S. PATENT DOCUMENTS 2,144,718 A * 1/1939 Gersbach ................ E06B 11/08 49/47
D206,667 S * 1/1967 Bakanowsky ............. D25/48.6
5,349,781 A * 9/1994 Libardi .................... G07C 9/10 49/47
D358,220 S * 5/1995 Detassis ...................... D25/48.6
5,819,470 A * 10/1998 Kionecka ................ E06B 11/08 49/46

(Continued)

FOREIGN PATENT DOCUMENTS

CN 111485513 A * 8/2020 ............... G07C 9/10
CN 112070912 A * 12/2020 ............ H04N 23/56

(Continued)

OTHER PUBLICATIONS

Translated spec CN112070912 (Year: 2020).*
Translated spec CN111485513 (Year: 2020).*

*Primary Examiner* — Catherine A Kelly
(74) *Attorney, Agent, or Firm* — HAUPTMAN HAM, LLP

(57) ABSTRACT

An authentication gate comprises a top surface of a gate body, first and second side surfaces of the gate body, and an inclined surface of the gate body. The top surface extends in a longitudinal direction of the gate body. The first side surface is provided to be perpendicular to the top surface. The first side surface also extends in the longitudinal direction and is connected to the top surface along the longitudinal direction. The second side surface is provided to be perpendicular to the top surface. The second side surface extends in a vertical direction of the gate body and is connected to the first side surface at an end portion in the longitudinal direction. The inclined surface is connected to the top surface, the first side surface, and the second side surface at an end portion in the longitudinal direction, respectively.

13 Claims, 6 Drawing Sheets

(56) References Cited

U.S. PATENT DOCUMENTS

| | | | | |
|---|---|---|---|---|
| 6,749,118 | B2 * | 6/2004 | Kobayashi | G07C 9/10<br>235/449 |
| 7,455,228 | B2 * | 11/2008 | Ponert | E06B 11/08<br>235/382.5 |
| D683,793 | S * | 6/2013 | Rhinn | D20/2 |
| 8,522,477 | B2 * | 9/2013 | Burgin | E06B 11/08<br>49/46 |
| 8,595,975 | B2 * | 12/2013 | van de Water | E06B 11/085<br>49/93 |
| D777,346 | S * | 1/2017 | Journet | D25/48.5 |
| D799,061 | S * | 10/2017 | Rauta | D25/48.5 |
| 10,006,247 | B2 * | 6/2018 | Ebner | E05F 15/60 |
| D825,781 | S * | 8/2018 | Behrooznia | D25/48.5 |
| D893,756 | S * | 8/2020 | Marquart | E06B 11/08<br>D10/49 |
| D895,151 | S * | 9/2020 | Giugiaro | D25/48.6 |
| 10,984,621 | B2 * | 4/2021 | Oh | G07C 9/15 |
| 11,235,955 | B2 * | 2/2022 | Kaufhold | E06B 11/085 |
| D954,299 | S * | 6/2022 | Yang | D25/48.6 |
| D957,689 | S * | 7/2022 | Kim | D25/48.6 |
| 11,649,676 | B2 * | 5/2023 | Gendig | E06B 11/085<br>49/358 |
| 11,887,423 | B2 * | 1/2024 | Steiert | G09F 13/049 |
| D1,042,886 | S * | 9/2024 | Moretti | D25/48.6 |
| 12,230,065 | B2 * | 2/2025 | Yamaoka | G06V 10/243 |
| 2001/0017585 | A1 | 8/2001 | Kobayashi et al. | |
| 2018/0182213 | A1 | 6/2018 | Osumi et al. | |
| 2019/0145169 | A1 * | 5/2019 | Marquart | G07C 9/15<br>49/46 |
| 2022/0268076 | A1 * | 8/2022 | Rauer | E01F 13/022 |

FOREIGN PATENT DOCUMENTS

| | | | | | |
|---|---|---|---|---|---|
| CN | 112855006 | A | * | 5/2021 | E06B 11/08 |
| CN | 113389155 | A | * | 9/2021 | G07C 9/10 |
| CN | 114482837 | A | * | 5/2022 | G07B 11/05 |
| EP | 1619631 | A1 | * | 1/2006 | G07C 9/10 |
| EP | 3901924 | A1 | * | 10/2021 | G07C 9/10 |
| GB | 1529031 | A | * | 10/1978 | E06B 11/08 |
| GB | 2549782 | A | * | 11/2017 | G07C 9/00 |
| JP | H11-213184 | A | | 8/1999 | |
| JP | 2001-243509 | A | | 9/2001 | |
| JP | 1229326 | S | | 2/2005 | |
| JP | 2005-174197 | A | | 6/2005 | |
| JP | 2017-090880 | A | | 5/2017 | |
| JP | 2021-196887 | A | | 12/2021 | |
| JP | 2023-045442 | A | | 4/2023 | |

* cited by examiner

AUTHENTICATION GATE

CROSS-REFERENCE TO RELATED APPLICATION

The present application claims priority under 35 U.S.C. § 119 to Japanese Patent Application No. 2023-187997, filed on Nov. 1, 2023, the contents of which application are incorporated herein by reference in their entirety.

TECHNICAL FIELD

The present disclosure relates to an authentication gate.

BACKGROUND

JP2005174197A discloses an automatic ticket gate provided at a ticket gate of a station of a railroad or the like. This automatic ticket gate reads data recorded on a train ticket and performs entrance and exit process. A housing constituting the automatic ticket gate includes a top surface and side surfaces connected to the top surface. In the top surface of the housing, a front portion (a portion on an inlet side) is inclined toward the front. In the inclined part, an antenna for communicating with a non-contact type train ticket is provided. The antenna is provided on the front inclined portion, and thus a user can easily recognize the antenna. Therefore, the user using the non-contact type train ticket can smoothly pass through the ticket gate.

Examples of documents showing a level of the technical field relating to the present disclosure include JP2023045442A, JPH11213184A, JP2021196887A and JP2001243509A, in addition to JP2005174197A.

A passenger train such as a railroad train is used when a user goes away from his/her home. Therefore, the train station may not be used when the user is out at a short distance. That is, the automatic ticket gate provided at the ticket gate of the station is not always used by the same person every day.

In the present disclosure, a residential area including a base of life of people is considered. It is assumed that a resident who has the base in the residential area frequently goes out at a short distance as a part of daily life. Therefore, unlike the automatic ticket gate provided at the ticket gate of the train station, a same person may pass through the entrance of the residential area every day. Further, as residents who go out at the short distance, persons of a wide range of age groups from children to elderly people are assumed. In such cases, in addition to passing by foot, passing with a stroller or bicycle, passing by a wheelchair, and the like are also assumed.

In the present disclosure, an authentication gate for coping with such various passing modes is also considered. Here, a typical configuration example of the authentication gate includes a configuration in which authentication data is read from a card or a device carried by the user to determine whether the user can pass through the authentication gate. Therefore, in the present disclosure, it is considered to cope with the above-described passing modes by using the authentication gate provided with the reading device for the authentication data.

First, it is desirable that an installation location of the reading device is a location that is easily recognized by the user. In addition, it is desirable to support various input modes (e.g., non-contact, a light contact, and a strong contact) of authentication data by the resident. That is, it is desirable that the installation location of the reading device is easily recognized by the user and has a certain strength. Further, depending on the position of an entrance, the authentication gate may be installed outdoors. Therefore, it is also desirable that the installation location of the reading device has a certain level of waterproofness.

However, when the strength and the waterproofness are given to the installation place of the reading device, the size of the installation place tends to be increased. If the size of the installation place is increased, the following problem occurs when the user performs an input operation of the authentication data. That is, a distance from a hand of a user (e. g., a child and a wheelchair user) to the reading device increases, and it becomes difficult for the user to perform the input operation of the authentication data.

One object of the present disclosure is to provide strength and waterproofness to the installation location of the reading device for authentication data included in the authentication gate while suppressing an increase in size of the installation location.

SUMMARY

An aspect of the present disclosure is an authentication gate and has the following features. The authentication gate comprises a top surface of a gate body, first and second side surfaces of the gate body, and an inclined surface of the gate body. The top surface extends in a longitudinal direction of the gate body. The first side surface is provided to be perpendicular to the top surface. The first side surface also extends in the longitudinal direction and is connected to the top surface along the longitudinal direction. The second side surface is provided to be perpendicular to the top surface. The second side surface extends in a vertical direction of the gate body and is connected to the first side surface at an end portion in the longitudinal direction. The inclined surface is connected to the top surface, the first side surface, and the second side surface at an end portion in the longitudinal direction, respectively. The inclined surface includes a support region supporting an outer circumference of a reading section of authentication data. The first side surface includes a central region adjacent to the top surface and a reading section side region adjacent to the second side surface and the inclined surface, respectively. The support region and the reading section side region is formed of a single member made of metal.

According to present disclosure, the support region supporting the outer circumference of the reading section of authentication data and the reading section side region adjacent to each of the second side surface and the inclined surface of the gate body are formed of the single member made of metal. Since the support region and the reading section side region are formed of the single member made of metal, it is possible to give a certain strength to the periphery of the reading section. Further, since the support region and the reading section side region are formed of the single member, it is possible to eliminate a joint between these regions and to provide a certain waterproof property around the reading section. Furthermore, it is possible to suppress the size from the support region to the reading section side region from being enlarged. Therefore, it is possible to provide strength and waterproofness to the periphery of the reading section while suppressing an increase in the size of the periphery of the reading section.

DESCRIPTION OF EMBODIMENT

Hereinafter, an embodiment of the present disclosure will be described with reference to the drawings. However, structures and the like described in the following embodiments are not necessarily essential to the present disclosure unless otherwise specified or unless clearly specified in principle.

1. Overall Configuration

Figure 1:
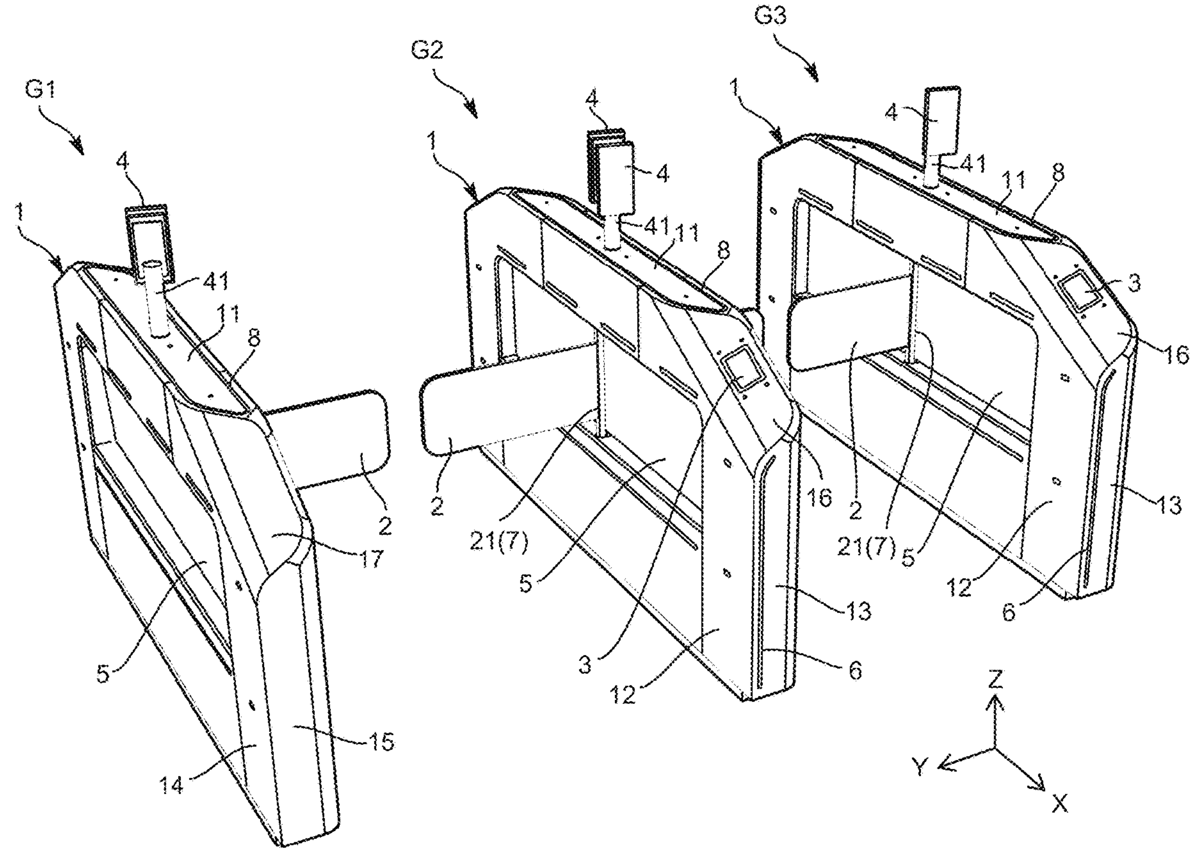
FIG. 1 is a perspective view of an authentication gate according to an embodiment.
Figure 2:
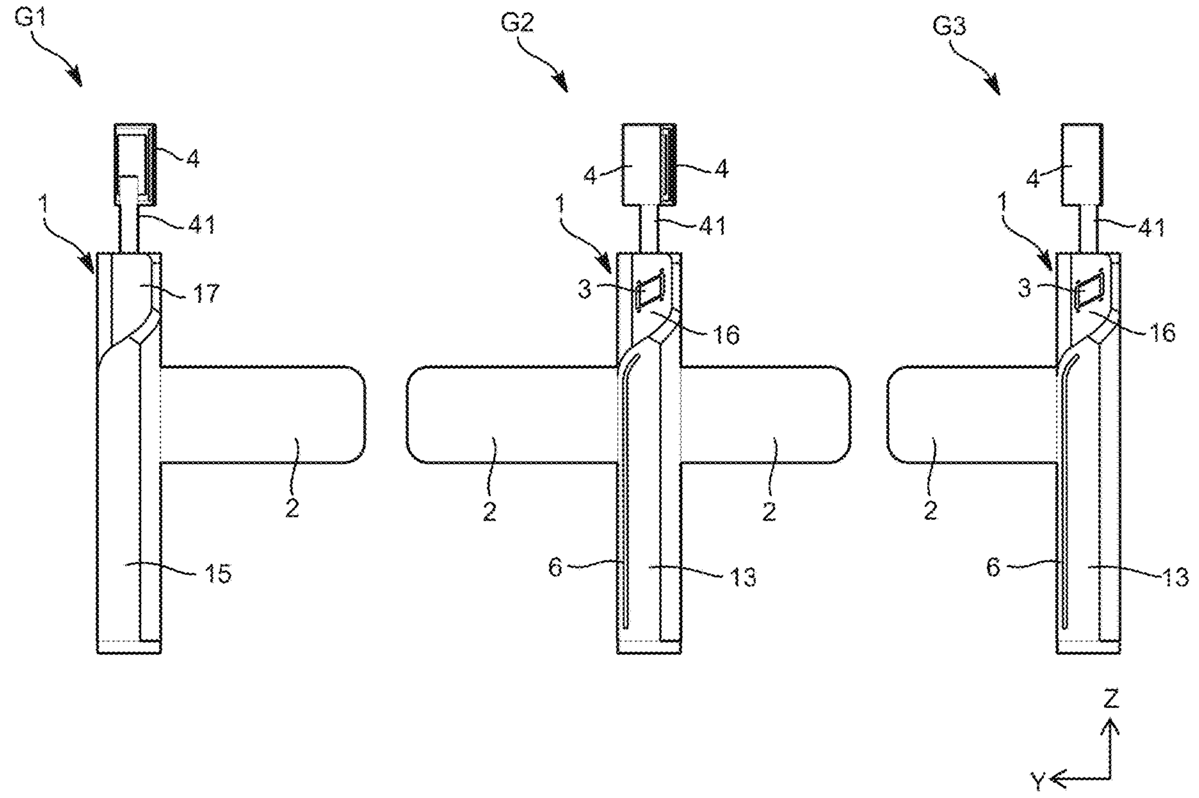
FIG. 2 is a front view of the authentication gate according to the embodiment.
Figure 3:
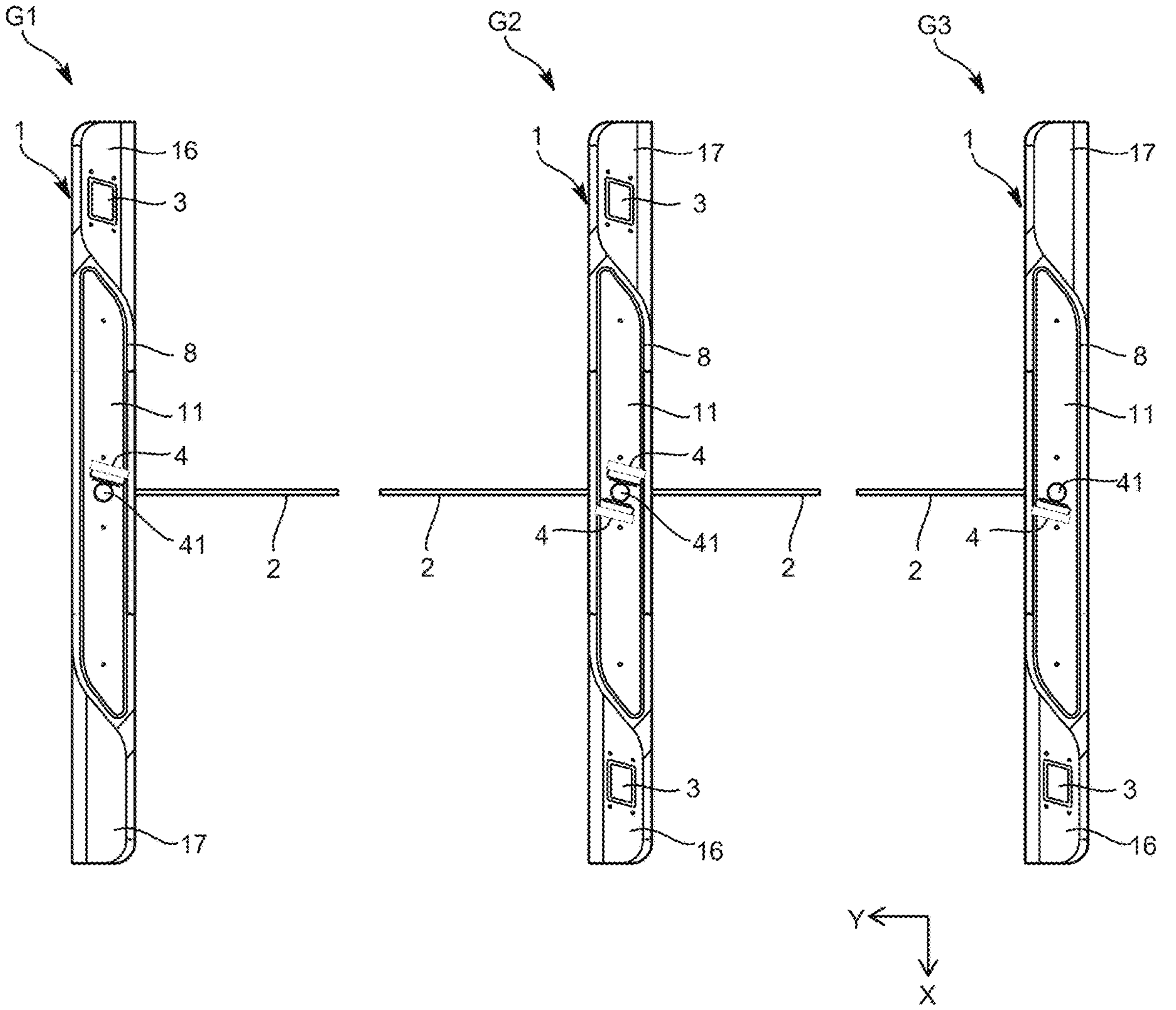
FIG. 3 is a plan view of the authentication gate according to the embodiment.

FIG. 1 is a perspective view of an authentication gate according to the embodiment. In FIG. 1, three authentication gates G1, G2 and G3 are depicted. FIG. 2 is a front view of these authentication gates. FIG. 3 is a plan view of these authentication gates. For convenience of description, X, Y, and Z-axes are depicted in FIGS. 1 to 3. X-axis indicates the longitudinal direction of the authentication gate. The Y axis indicates the direction of arrangement of the three authentication gates. The Z-axis indicates the height direction of the authentication gate, and coincides with the vertical direction. The directions indicated by X, Y, and Z-axes are common to the drawings other than FIGS. 1 to 3.

The authentication gates G1, G2, and G3 are provided at an entrance and exit of a residential area, for example. The residential area may be a site of one or more detached houses or a site of one or more multiple dwelling houses (for example, an apartment). In the residential area, various facilities (for example, a commercial facility, a public facility, an educational facility, a medical welfare facility, and the like) other than the house may be provided. In this case, the authentication gate G1, G2, and G3 may be provided in various doorways of the facility. Hereinafter, it is assumed that the residential area is located in the negative direction of the X-axis.

The basic configurations of the authentication gates G1 to G3 are the same. The configuration of the authentication gate G1 is the same as that of the authentication gate G3. The authentication gate G1 performs authentication of a person who leaves the residential area. The authentication gate G3 also performs authentication of a person entering the residential area. The authentication gate G2 is different from the authentication gate G1 and the G3 in that the reading section of the authentication date is provided in both the positive direction and the negative direction of the X-axis (details will be described later). This is because the authentication gate G2 performs not only authentication of a person who leaves the residential area but also authentication of a person who enters the residential area. The number of the authentication gate G2 is arbitrarily determined according to a breadth of the entrance (a width in the Y-axis direction). For example, when the width of the doorway is wide, the number of installed doors is two or more, and when the width of the doorway is narrow, the number of installed doors is zero.

Hereinafter, the authentication gates G1 to G3 are collectively referred to as an "authentication gate G" unless otherwise distinguished. The authentication gate G is an authentication gate of a normally closed flapper type. The authentication gate G includes a gate body 1, a transparent flapper 2, a reading section 3 for authentication data, and a camera 4. The authentication gate G performs authentication of a person entering the authentication gate G by using at least one of the reading section 3 and the camera 4, and controls the open/close state of the transparent flapper 2 according to the authentication result.

The gate body 1 has a housing structure including a top surface 11, a first side surface 12, a second side surface 13, a third side surface 14, and a fourth side surface 15. The main surface of the housing structure is formed of, for example, a metal plate material. A partial region of the main surface (for example, a central region of the top surface 11) may be formed of a resin plate material.

The top surface 11 extends in the longitudinal direction (i.e., the X-axis direction) of the gate body 1. The plane direction of the top surface 11 is parallel to the XY plane. Like the top surface 11, the first side surface 12 and the third side surface 14 extend in the X-axis direction. The first side surface 12 and the third side surface 14 are paired. The first side surface 12 and the third side surface 14 are connected to the top surface 11 along the X-axis direction. The surface directions of the first side surface 12 and the third side surface 14 are parallel to the XZ plane.

Openings are formed in the central portions of the first side surface 12 and the third side surface 14, and these openings communicate with each other. The communication opening is provided with a transparent material 5 (for example, a glass plate or an acrylic plate). The transparent material 5 is provided for the purpose of allowing a user with a low height of the eyes, such as a child or a wheelchair user, to easily grasp the situation at a place away from the gate body 1. Note that, in a case where the effect of the communication opening is not expected, such as a case where the authentication gate G is disposed along a wall, the communication opening may not be formed, and the transparent material 5 may not be provided.

The second side surface 13 and the fourth side surface 15 extend in the Z-axis direction. The second side surface 13 and the fourth side surface 15 are paired. The second side surface 13 is connected to the first side surface 12 and the third side surface 14 at the end of the gate body 1 in the X-axis positive direction. The fourth side surface 15 is connected to the first side surface 12 and the third side surface 14 at the end of the gate body 1 in the X-axis negative direction. The surface directions of the second side surface 13 and the fourth side surface 15 are parallel to the YZ plane.

A slit is formed in the second side surface 13 along the Z-axis direction, and the LED illumination 6 is provided at the position where the slit is formed. The LED illumination 6 is provided to facilitate recognition of the entrance of the authentication gate G and the installation location of the reading section 3 from a distance. According to the LED illumination 6, an effect of informing the weak-sighted person of the shape of the authentication gate G is also expected. Control of the LED illumination 6 (for example, control of the light emission mode and the light emission color of the LED element) may be performed by a data processing device (not shown) that performs an authentication process or may be performed by a processing device (not shown) for control.

The gate body 1 also includes a first inclined surface 16 and a second inclined surface 17. The first inclined surface 16 is connected to the top surface 11, the first side surface 12, the second side surface 13, and the third side surface 14 at the end of the gate body 1 in the X-axis positive direction. The second inclined surface 17 is connected to the top surface 11, the first side surface 12, the third side surface 14, and the fourth side surface 15 at the end of the gate body 1 in the X-axis negative direction. The first inclined surface 16 is provided with a reading section 3. The reading section 3 is also provided on the second inclined surface 17 of the authentication gate G2. The reading section 3 will be described in detail later.

The transparent flapper 2 is provided in the central portion of the first side surface 12 in the authentication gate G. The transparent flapper 2 is also provided in the central portion of the third side surface 14 in the authentication gate G2. The transparent flapper 2 is rotatably supported by a support member 21 disposed in the Z-axis direction. The transparent flapper 2 is opened and closed according to the result of the authentication process by the data processing device. For example, the transparent flapper 2 may be opened according to a first output (passage permit) by the authentication process and may be closed according to a second output (passage non-permit).

The operation of the transparent flapper 2 may be performed by a data processing device that performs an authentication process, or may be performed by a processing device (not shown) dedicated to the operation. The transparent flapper 2 is operated in a pair of two. For example, when the authentication process is performed in the authentication gate G2, the transparent flapper 2 provided on the first side surface 12 of the authentication gate G2 and the transparent flapper 2 provided on the first side surface 12 of the authentication gate G1 are synchronously operated. When the authentication process is performed in the authentication gate G3, the transparent flapper 2 provided on the first side surface 12 of the authentication gate G3 and the transparent flapper 2 provided on the third side surface 14 of the authentication gate G2 are operated synchronously.

The reading section 3 is provided on the first inclined surface 16. The reading section 3 reads at least one of authentication data stored in an IC chip of a card and authentication data encrypted by a two dimensional barcode, and transmits the read data to the data processing device. The surface direction of the reading section 3 is parallel to the surface direction of the first inclined surface 16. The height position of the reading section 3 is substantially the same as that of the first inclined surface 16. The reading section 3 is also provided on the second inclined surface 17 of the authentication gate G2. The surface direction of the reading section 3 provided on the second inclined surface 17 is parallel to the surface direction of the second inclined surface 17. The height position of the reading section 3 provided on the second inclined surface 17 is substantially the same as that of the second inclined surface 17.

The camera 4 is attached to a support pillar 41 extending above the top surface 11. The support pillar 41 is provided at the center of the top surface 11. The support pillar 41 has a hollow structure, and the wiring of the camera 4 is accommodated therein. Two cameras 4 are attached to the support pillar 41 of the authentication gate G2 in a back-to-back manner. The camera 4 acquires an image of the surroundings of the authentication gate G. An image acquired by the camera 4 (hereinafter, also referred to as a "camera image") is transmitted to a data processing device (not shown).

In the authentication gate G, an authentication process (hereinafter, also referred to as a "personal data authentication process") in the authentication gate G is performed based on the authentication data read by the reading section 3. In the personal data authentication process, for example, personal data registered in advance is collated with at least one of authentication data stored in the IC chip of the card and authentication data encrypted by a two-dimensional barcode.

In the authentication gate G, an authentication process based on the camera image (hereinafter, also referred to as a "face authentication process") is also performed. The face authentication process is performed instead of the personal data authentication process or in combination with the personal data authentication process. It is assumed that residents of the residential area carry a card with an IC chip or a device capable of outputting authentication data. However, even when the resident does not carry the card or the device, the face authentication process is performed so that the resident can pass through the authentication gate G. The face authentication process is also performed for a user other than the resident of the residential area (for example, a guest of the residential area) to pass through the authentication gate G. In the face authentication process, a face image registered in advance is compared with a face image included in the camera image.

2. Features of Embodiment

Figure 4:
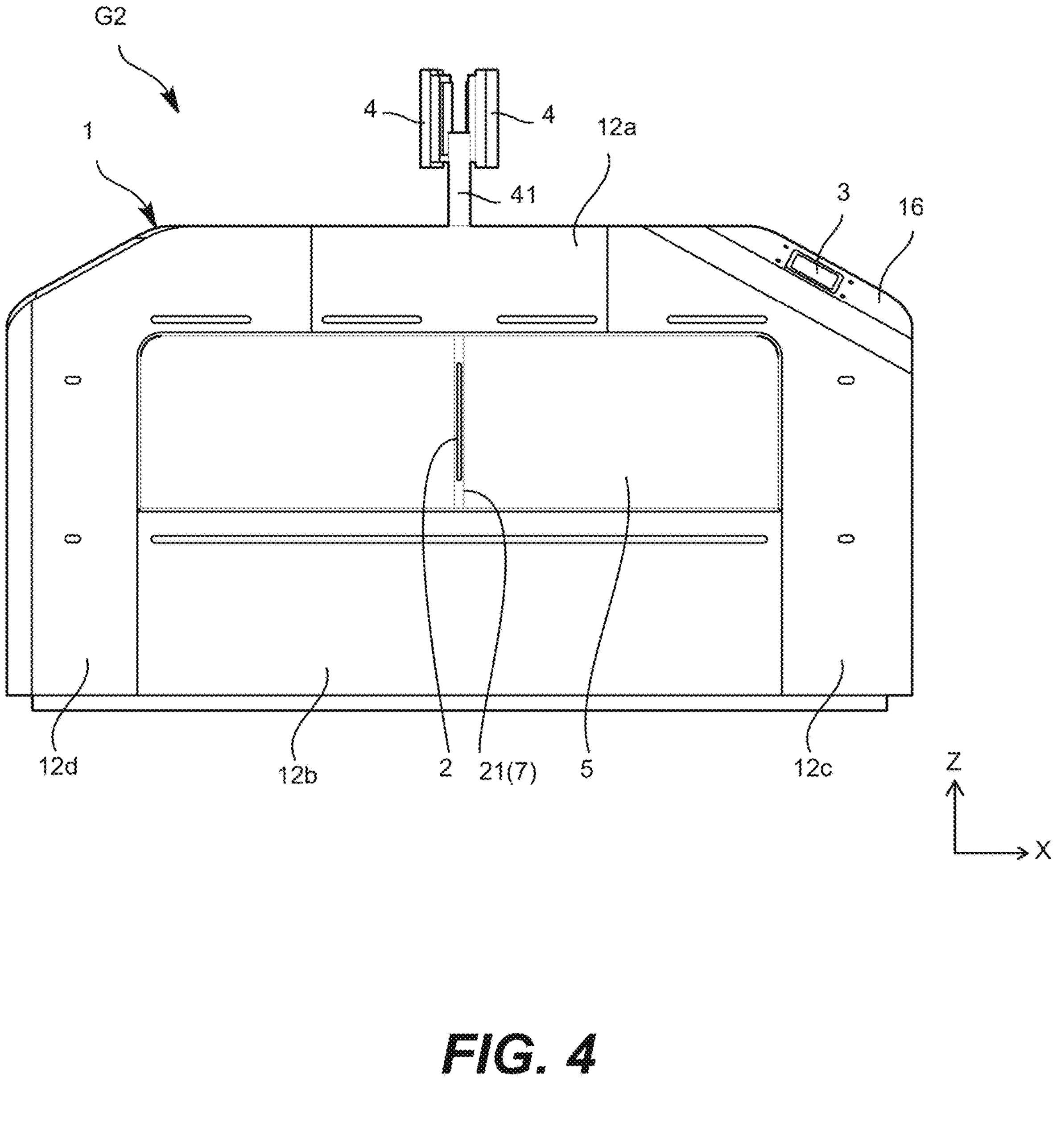
FIG. 4 is a side view of the authentication gate according to the embodiment.
Figure 5:
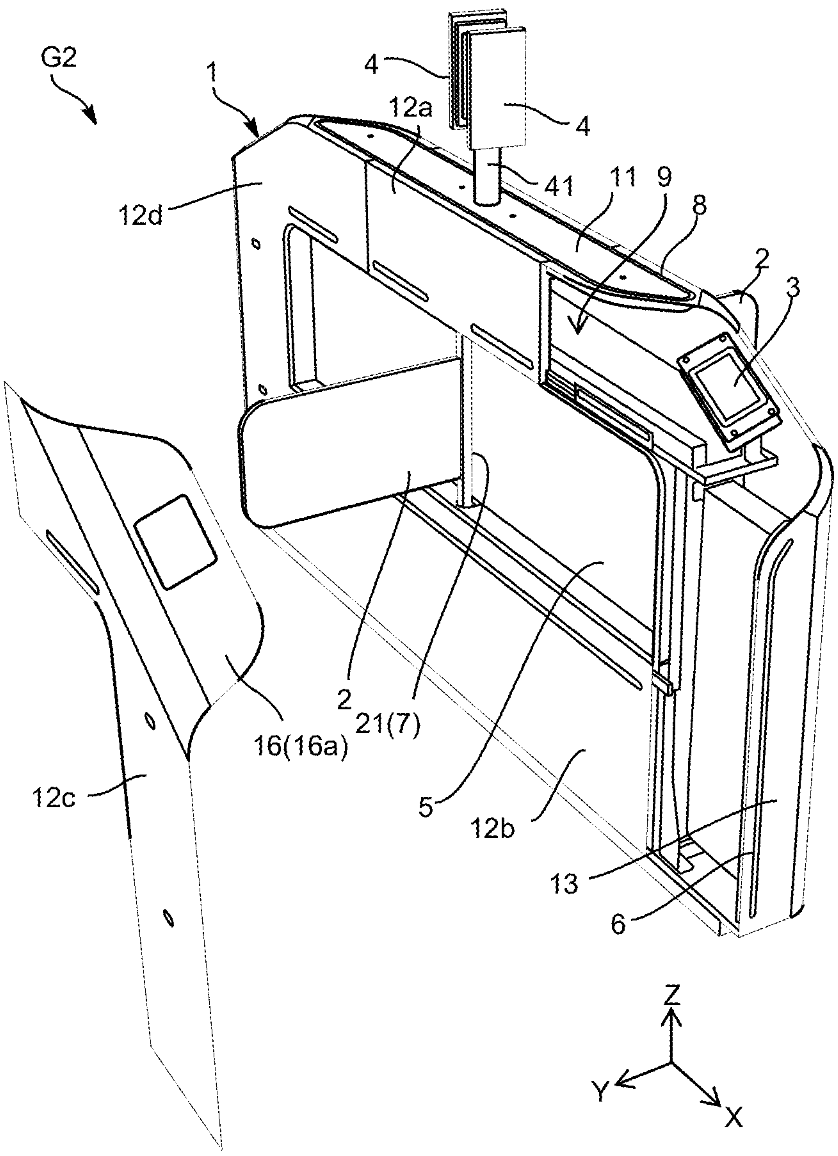
FIG. 5 is a partially exploded view of an authentication gate according to the embodiment.
Figure 6:
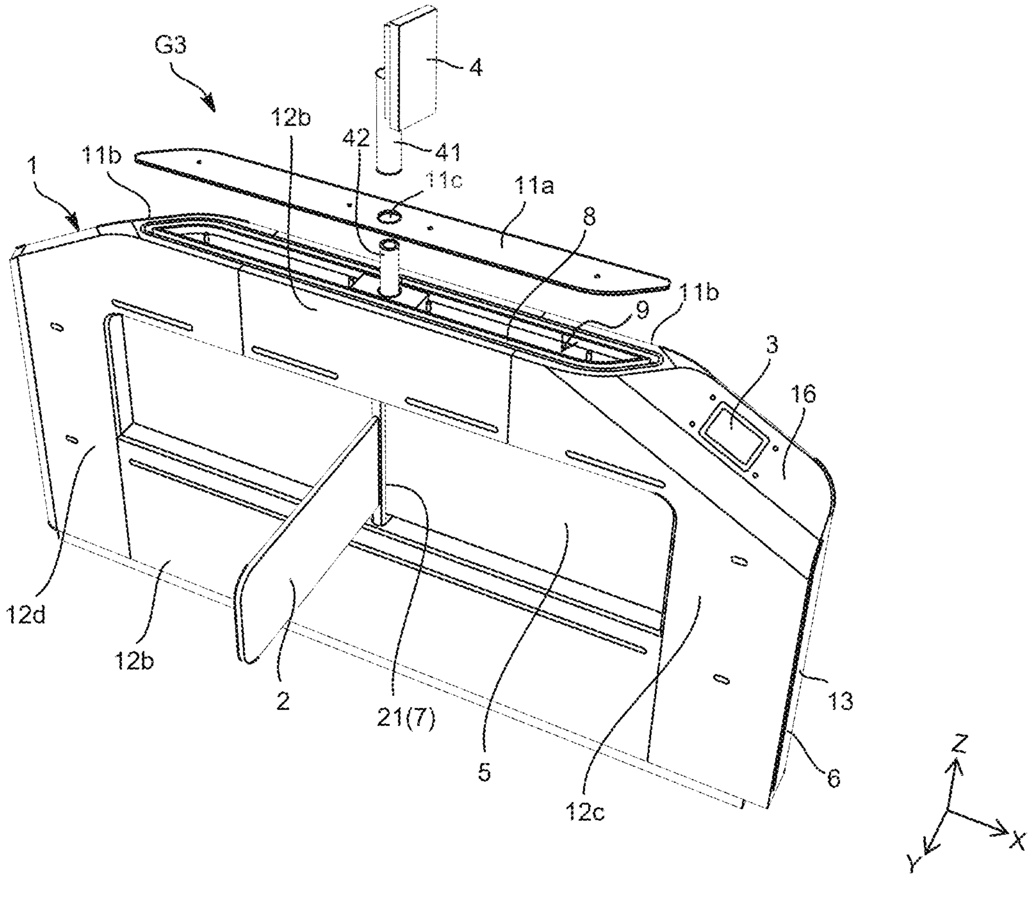
FIG. 6 is a partially exploded view of the authentication gate according to the embodiment.

In addition to the overall configuration described above, the authentication gate G has the following features. This feature will be described with reference to FIGS. 4 to 6. FIG. 4 is a side view of the authentication gate G2. FIG. 5 is a partially exploded view of the authentication gate G2. FIG. 6 is a partially exploded view of the authentication gate G3.

2-1. Features Around the Reading Section 3

As shown in FIGS. 4 and 5, the first side surface 12 includes an upper central region 12*a*, a lower central region 12*b*, a lateral region 12*c*, and a lateral region 12*d*. The upper central region 12*a* is a region of the first side surface 12 adjacent to the top surface 11. The upper central region 12*a* corresponds to the "central region" of the present disclosure. The lower central region 12*b* is opposed to the upper central region 12*a* with the transparent material 5 interposed therebetween. The lateral region 12*c* is a region adjacent to the second side surface 13 and the first inclined surface 16. The lateral region 12*c* corresponds to the "reading section side region" of the present disclosure. The lateral region 12*c* is also adjacent to the top surface 11. The lateral region 12*d* is opposed to the lateral region 12*c* with the transparent material 5 interposed therebetween. The lateral region 12*d* is adjacent to the top surface 11, the fourth side surface 15, and the second inclined surface 17.

As shown in FIG. 5, the first inclined surface 16 is formed of a support region 16*a* which surrounds the exposed region of the reading section 3 and supports the outer periphery of the reading section 3. The configuration of the second inclined surface 17 of the authentication gate G2 is the same as that of the first inclined surface 16. That is, the second inclined surface 17 of the authentication gate G2 is formed of a support region which surrounds the exposed region of the reading section 3 and supports the outer periphery of the reading section 3.

As described above, the first side surface 12 is formed of, for example, a metal plate material. Therefore, the upper central region 12*a*, the lower central region 12*b*, the lateral region 12*c*, and the lateral region 12*d* constituting the first side surface 12 are also formed of, for example, a metal plate material. Here, the lateral region 12*c* is continuous with the support region 16*a*. That is, the lateral region 12*c* and the support region 16*a* are formed of a single metal plate. Since the reading section 3 is formed of a single metal plate, a certain strength is given to the periphery of the reading section 3. Further, a certain waterproof property is given to the periphery of the reading section 3 by eliminating the joint between the lateral region 12*c* and the support region 16*a*.

The lateral region 12*c* and the support region 16*a* are formed by bending a plate material. A connecting portion between the support region 16*a* and the lateral region 12*c* may have a curved shape. Such a shape of the connecting portion is formed only by bending a single plate material. The curved shape of the connection portion provides a certain degree of security around the reading section 3. In particular, some users such as children, wheelchair users, bicycle users, etc., are likely to touch the periphery of the reading section 3 when they stretch their arms for the input operation of the authentication data. In this regard, according to the connection portion having the curved shape, it is possible to avoid the injury due to the contact with the connection portion in advance.

The upper central region 12*a* and the lateral region 12*c* are connected by welding from the inside of the gate body 1. The connection between the upper central region 12*a* and the lateral region 12*d*, the connection between the lower central region 12*b* and the lateral region 12*c*, and the connection between the lower central region 12*b* and the lateral region 12*c* are also made by welding from the inside of the gate body 1.

The surfaces of the reading section 3 are inclined downward toward the second side surfaces 13 and toward the lateral regions 12*c*. The support region 16*a* is formed in a direction parallel to the inclination direction of the reading section 3. The front face of the reading section 3 and the support region 16*a* are inclined downward toward the second side surface 13, and thus the installation location of the reading section 3 is easily recognized from a distance. Since the surfaces of the reading section 3 and the support region 16*a* are inclined downward toward the lateral region 12*c*, the installation position of the reading section 3 can be easily recognized when the authentication data entry operation is performed. Further, the input operation of the authentication data is facilitated.

2-2. Features Around the Top Surface 11

As shown in FIG. 6, the top surface 11 is composed of a lid 11*a* extending in the X-axis direction and a frame 11*b* surrounding the lid 11*a*. The lid 11*a* has a parallelogram shape with rounded corners, and is made of, for example, a resin-made plate material. An opening 11*c* through which the support pillar 41 penetrates is formed at the center of the lid 11*a*. At the end of the gate body 1 near the fourth side surface 15, the frame 11*b* extends between the lateral region 12*d* and the second inclined surface 17 and is connected to the fourth side surface 15. The stretched part of the frame 11*b* is also present between the third side surface and the first inclined surface 16.

The lid 11*a* is provided to be attachable to and detachable from the gate body 1. A space 9 is formed below the lid 11*a*. Since the space 9 is formed, various additional devices can be accommodated when additional functions are added to the authentication gate G. As the various additional devices, user interfaces such as a display, a touch panel, and a speaker are assumed. When an additional device is provided, the lid 11*a* is removed from the gate body 1, the additional device is housed in the space 9, and the lid 11*a* is drilled to expose necessary elements of the additional device. Since the space 9 is formed, workability at the time of simple system maintenance such as updating of software of the reading section 3 is also secured.

The top surface 11 is also provided with a slit between the lid 11*a* and the frame 11*b*, and the LED illumination 8 is provided at the position where the slit is formed. The LED illumination 8 is provided to facilitate recognition of the travel direction in the authentication gate G. The LED illumination 8 may emit light according to a result of an authentication process by the data processing device. The control of the LED illumination 8 (for example, the control of the light emission mode and the light emission color of the LED element) may be performed by a data processing device that performs an authentication process or may be performed by a processing device for control (not illustrated).

2-3. Features Around the Transparent Flapper 2

As shown in FIGS. 5 and 6, the LED illumination 7 is provided on the support member 21 along the Z-axis direction. The LED illumination 7 illuminates the surface of the transparent flapper 2 in a predetermined color (e.g., white, red, and blue). The color of the emitted light is set according to the state of the authentication process (i.e., the authentication process of the personal data and the face authentication process). For example, in the case of the standby state, the emission color is set to white. In addition, the light emission color is set to blue in the case of the passage permit state, and the light emission color is set to red in the case of the passage non-permit state. The LED illumination 7 may be controlled by a data processing device that performs an authentication process or a processing device for control (not shown). The control of the LED illumination 7 may be performed in coordination with the control of the LED illumination 8.

By controlling the LED illumination 7, the result of the authentication process can be transmitted to the person passing through the authentication gate G. According to the control of the LED illumination 7, an effect of informing the weak-sighted person of the position of the path of the authentication gate G is also expected.

What is claimed is:

1. An authentication gate, comprising:

a top surface extending in a longitudinal direction of a gate body;

a first side surface provided perpendicular to the top surface, the first side surface extending in the longitudinal direction and connected to the top surface along the longitudinal direction;

a second side surface provided perpendicular to the top surface, the second side surface extending in a vertical direction of the gate body and connected to the first side surface at an end portion in the longitudinal direction; and an inclined surface provided at an end portion in the longitudinal direction and connected to the top surface, the first side surface, and the second side surface, respectively, wherein:

the inclined surface includes a support region supporting an outer circumference of a reading section of authentication data;

the first side surface includes:

a central region adjacent to the top surface, and a reading section side region adjacent to the second side surface and the inclined surface; and the support region and the reading section side region are formed of a single member made of metal, the authentication gate further comprising:

a transparent flapper provided in the central region;

a support member rotatably supporting the transparent flapper; and a first LED illumination provided in the support member and configured to illuminate a surface of the transparent flapper according to a state of an authentication process based on the authentication data, wherein a color of light emitted from the first LED illumination is controlled according to the state of the authentication process, and the state of the authentication process includes at least one of a standby state, a passage permit state or a passage non-permit state.

2. The authentication gate according to claim 1, wherein a connection portion between the support region and the reading section side region has a curved shape.

3. The authentication gate according to claim 1, wherein:

a surface of the reading section is inclined downward toward the second side surface and is inclined downward toward the reading section side region; and the support region is formed in a direction parallel to an inclination direction of a surface of the reading section.

4. The authentication gate according to claim 1, wherein:

the top surface includes a detachable lid; and a space is formed below the lid along the longitudinal direction.

5. The authentication gate according to claim 4, wherein:

the top surface further includes a frame, and a second LED illumination at a slit between the detachable lid and the frame, and the second LED illumination is controlled to emit a color in coordination with the color of the light emitted from the first LED illumination.

6. The authentication gate according to claim 1, further comprising:

a camera configured to acquire an image of surroundings of the authentication gate, wherein the authentication process is performed based on the authentication data and the image.

7. The authentication gate according to claim 1, further comprising:

an opening in a central portion of the first side surface; and a transparent plate in the opening.

8. The authentication gate according to claim 1, wherein the color of the light emitted from the first LED illumination is changed among first through third different colors corresponding to the standby state, the passage permit state and the passage non-permit state.

9. The authentication gate according to claim 8, wherein:

the top surface further includes a frame, and a second LED illumination at a slit between the detachable lid and the frame, and the second LED illumination is controlled to emit a color in coordination with the color of the light emitted from the first LED illumination.

10. The authentication gate according to claim 9, further comprising:

a camera configured to acquire an image of surroundings of the authentication gate, wherein the authentication process is performed based on the authentication data and the image.

11. The authentication gate according to claim 10, further comprising:

an opening in a central portion of the first side surface; and a transparent plate in the opening.

12. An authentication gate, comprising:

a top surface extending in a longitudinal direction of a gate body;

a first side surface provided perpendicular to the top surface, the first side surface extending in the longitudinal direction and connected to the top surface along the longitudinal direction;

a second side surface provided perpendicular to the top surface, the second side surface extending in a vertical direction of the gate body and connected to the first side surface at an end portion in the longitudinal direction; and an inclined surface provided at an end portion in the longitudinal direction and connected to the top surface, the first side surface, and the second side surface, respectively, wherein:

the inclined surface includes a support region supporting an outer circumference of a reading section of authentication data;

the first side surface includes a central region adjacent to the top surface, and a reading section side region adjacent to the second side surface and the inclined surface; and the support region and the reading section side region are formed of a single member made of metal, the authentication gate further comprising:

a transparent flapper provided in the central region;

a support member rotatably supporting the transparent flapper; and an LED illumination provided in the support member and configured to illuminate a surface of the transparent flapper according to a state of an authentication process based on the authentication data.

13. The authentication gate according to claim 12, further comprising:

a camera configured to acquire an image of surroundings of the authentication gate, wherein the authentication process is performed based on the authentication data and the image.

* * * * *